US010070184B2

(12) United States Patent
Machanic et al.

(10) Patent No.: US 10,070,184 B2
(45) Date of Patent: *Sep. 4, 2018

(54) SYSTEM AND METHOD TO REMOVE THE DATE SPECIFIC INFORMATION FROM A BROADCAST AUTOMATION PLAYLIST

(71) Applicant: Disney Enterprises, Inc., Burbank, CA (US)

(72) Inventors: Steven Machanic, Dumont, NJ (US);
Robert Jensen, New York, NY (US);
Hugh McGuire, Westfield, NJ (US);
Raul Rapalo, Bronx, NY (US);
Michael Strein, Bohemia, NY (US);
Vladislav Feldman, Manhasset Hills, NY (US); Jeffrey Corwin, Forest Hills, NY (US); Kenneth Michel, Brightwaters, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/612,585

(22) Filed: Jun. 2, 2017

(65) Prior Publication Data

US 2018/0007434 A1 Jan. 4, 2018

Related U.S. Application Data

(63) Continuation of application No. 15/200,597, filed on Jul. 1, 2016, now Pat. No. 9,729,926.

(51) Int. Cl.
*H04N 21/454* (2011.01)
*H04N 21/81* (2011.01)
(Continued)

(52) U.S. Cl.
CPC ....... *H04N 21/454* (2013.01); *H04N 21/4334* (2013.01); *H04N 21/47202* (2013.01);
(Continued)

(58) Field of Classification Search
CPC .......... H04N 21/485; H04N 21/44016; H04N 21/454; H04N 21/4334; H04N 21/47202;
(Continued)

(56) References Cited

U.S. PATENT DOCUMENTS 9,729,926 B1 * 8/2017 Machanic ............ H04N 21/454

* cited by examiner

*Primary Examiner* — Hunter B Lonsberry
(74) *Attorney, Agent, or Firm* — Patterson + Sheridan, LLP (57) ABSTRACT

Embodiments herein describe a content distribution system that removes time-dependent promotional content before providing a recording of a media presentation (e.g., show or program) to a video-on-demand (VOD) provider. To receive Nielsen credit for a subscriber watching a recording of the media presentation using VOD, the recording must be almost the same as the live version of the media presentation which includes the original program content and the commercial advertisements shown during commercial breaks. However, some shows also include promotional content that a telecommunication or cable provider adds to the media presentation to promote other shows or events being broadcasted later. By the time the user views the recording, however, the promotional content may already be outdated. The embodiments herein describe techniques for removing time-dependent promotional content from a media presentation before the recording of the media presentation is sent to VOD providers.

20 Claims, 5 Drawing Sheets

(51) Int. Cl.
    *H04N 21/433*     (2011.01)
    *H04N 21/482*     (2011.01)
    *H04N 21/845*     (2011.01)
    *H04N 21/472*     (2011.01)

(52) U.S. Cl.
    CPC ....... *H04N 21/4825* (2013.01); *H04N 21/812* (2013.01); *H04N 21/845* (2013.01)

(58) Field of Classification Search
    CPC . H04N 21/4825; H04N 21/812; H04N 21/845
    See application file for complete search history.

FIG. 1

| | START TIME | TYPE | TITLE | DURATION |
|---|---|---|---|---|
| 1 | 00:00 | PROGRAM | SEGMENT 1 | 20:00 |
| 2 | 4:17 | SNIPE | HOLIDAY_LOGO | 0:10 |
| 3 | 6:30 | SNIPE | NEXT_UP | 0:15 |
| 4 | 20:00 | AD | PRODUCT_X | 0:30 |
| 5 | 20:30 | AD | PRODUCT_Y | 0:15 |
| 6 | 20:45 | PROMO | SHOW_X | 0:30 |
| 7 | 21:15 | AD | PRODUCT_Z | 0:30 |
| 8 | 21:45 | PROGRAM | SEGMENT 2 | 20:00 |
| 9 | 25:00 | SNIPE | NEXT_UP | 0:10 |
| 10 | 27:00 | SNIPE | STANDARD_LOGO | 0:15 |
| 11 | 41:45 | AD | PRODUCT_A | 0:30 |

*FIG. 2*

|   | START TIME | TYPE | TITLE | DURATION |
|---|---|---|---|---|
| 1 | 00:00 | PROGRAM | SEGMENT 1 | 20:00 |
| 2 | 20:00 | AD | PRODUCT_X | 0:30 |
| 3 | 20:30 | AD | PRODUCT_Y | 0:15 |
| 4 | 20:45 | PROMO | SHOW_X | 0:30 |
| 5 | 21:15 | AD | PRODUCT_Z | 0:30 |
| 6 | 21:45 | PROGRAM | SEGMENT 2 | 20:00 |
| 7 | 27:00 | SNIPE | STANDARD_LOGO | 0:15 |
| 8 | 41:45 | AD | PRODUCT_A | 0:30 |

|   | START TIME | TYPE | TITLE | DURATION |
|---|---|---|---|---|
| 1 | 00:00 | PROGRAM | SEGMENT 1 | 20:00 |
| 2 | 4:17 | SNIPE | GENERIC_LOGO | 0:10 |
| 3 | 20:00 | AD | PRODUCT_X | 0:30 |
| 4 | 20:30 | AD | PRODUCT_Y | 0:15 |
| 5 | 20:40 | PROMO | GENERIC_PROMO | 0:30 |
| 6 | 21:15 | AD | PRODUCT_Z | 0:30 |
| 7 | 21:45 | PROGRAM | SEGMENT2 | 20:00 |
| 8 | 27:00 | SNIPE | STANDARD_LOGO | 0:15 |
| 9 | 41:45 | AD | PRODUCT_A | 0:30 |

SYSTEM AND METHOD TO REMOVE THE DATE SPECIFIC INFORMATION FROM A BROADCAST AUTOMATION PLAYLIST

CROSS-REFERENCE TO RELATED APPLICATIONS

This application is a continuation of co-pending U.S. patent application Ser. No. 15/200,597, filed Jul. 1, 2016. The aforementioned related patent application is herein incorporated by reference in its entirety.

BACKGROUND

Field of the Invention

The embodiments herein are generally directed to removing time-dependent content from a timeslot playlist before providing content to a video-on-demand (VOD) provider.

Description of the Related Art

Broadcast playlists or schedules list the sequence of events for a broadcast or cable channel. These playlists are typically based on a section of the day and contain topical promotional content in the form of on-screen graphics (referred to herein as snipes) and video promotional advertisements. This topical content can advertise what is being played later that day on the broadcast or cable channel.

In addition to broadcasting live content, a telecommunication or cable provider may offer VOD where a subscriber can use a set top box to stream a pre-recorded version of the broadcasted content over the provider's network. As such, the subscriber can watch the content at a later time. If the recorded version is the same (or very similar) to the content that was broadcasted live, then Nielsen credit can be given to the provider (assuming the subscriber is a Nielsen family) which affects the advertisement revenue associated with the content. Typically, the recorded version distributed using VOD is the exact same as the live content so that the provider can get Nielsen credit for any subscriber who views the recorded version within a certain time period of when the live content was broadcasted—e.g., within three days.

SUMMARY

One embodiment described here is a method for providing a recording of a media presentation. The method includes receiving a timeslot playlist for the media presentation where the timeslot playlist includes a list of content to be provided to a user and where the list of content includes entries for program content, time-dependent promotional content, and commercial advertisement content. Moreover, the time-dependent promotional content contains information that is relevant depending on when the user views the media presentation. The method includes removing at least a portion of the time-dependent promotional content from the timeslot playlist to generate an adjusted timeslot playlist and assembling, using one or more computer processors, content listed in the adjusted timeslot playlist to generate the recording of the media presentation where the recording includes the program content and the commercial advertisement content and excludes the removed time-dependent promotional content.

Another embodiment described herein includes a non-transitory computer readable storage medium that includes computer-readable program code for providing a recording of a media presentation. When executed by a computing processor, the computer-readable program code performs an operation that includes receiving a timeslot playlist for the media presentation where the timeslot playlist includes a list of content to be provided to a user and where the list of content includes entries for program content, time-dependent promotional content, and commercial advertisement content. Moreover, the time-dependent promotional content contains information that is relevant depending on when the user views the media presentation. The operation also includes removing at least a portion of the time-dependent promotional content from the timeslot playlist to generate an adjusted timeslot playlist and assembling, using one or more computer processors, content listed in the adjusted timeslot playlist to generate the recording of the media presentation where the recording includes the program content and the commercial advertisement content and excludes the removed time-dependent promotional content.

Another embodiment described herein includes one or more computing processors and a memory including a program that when executed by the one or more computer processor performs an operation. The operation includes receiving a timeslot playlist for the media presentation where the timeslot playlist includes a list of content to be provided to a user and where the list of content includes entries for program content, time-dependent promotional content, and commercial advertisement content. Moreover, the time-dependent promotional content contains information that is relevant depending on when the user views the media presentation. The operation also includes removing at least a portion of the time-dependent promotional content from the timeslot playlist to generate an adjusted timeslot playlist and assembling, using one or more computer processors, content listed in the adjusted timeslot playlist to generate the recording of the media presentation where the recording includes the program content and the commercial advertisement content and excludes the removed time-dependent promotional content.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments herein describe a content distribution system that removes time-dependent promotional content before providing a recording of a media presentation (e.g., show or program) to a VOD provider. To receive Nielsen credit for a subscriber watching a recording of the media presentation using VOD, the recording must be almost the same as the live version of the media presentation. That is, the recording includes the same program content and commercial advertisements shown during the commercial breaks of the live broadcast. However, some media presentations also include promotional content that a telecommunication or cable provider adds to the presentation to promote other shows or events being broadcasted later. For example, while displaying program content, a graphic or image may pop up in the bottom third of the display screen (i.e., a snipe) that promotes a media presentation that may be airing next on the channel. In another example, instead of showing a commercial advertisement during a commercial break, one timeslot may be used to show a promotional advertisement for a show airing later that day on the channel.

In addition to broadcasting the media presentation live, the content distribution system also provides a recording of the presentation that can be used by a VOD provider to provide the media presentation on demand—i.e., when requested by a user. For example, a user may watch the recording of the media presentation one or two days after the media presentation aired live. By the time the user views the recording, however, the promotional content may already be outdated. That is, if the snipe promotes a different media presentation occurring on the same day as the media presentation aired, if the user views the recording of the presentation the next day using VOD, the snipe is irrelevant or stale. The user may be frustrated having to view promotional content that is outdated. Instead, the embodiments herein describe techniques for removing time-dependent promotional content from a media presentation before the recording of the presentation is sent to a VOD provider. In one embodiment, the content distribution system includes a content filter that identifies and removes time-dependent promotional content from a timeslot playlist of the show. Once updated, the distribution system can then use the new timeslot playlist to assemble the content for the media presentation (e.g., the program and commercial content) and generate the recording of the presentation. In this example, the recording of the media presentation is the exact same as the live version of the media presentation except that the time-dependent promotional content has been removed. Removing the time-dependent content may reduce clutter in the media presentation and improve user satisfaction.

In another embodiment, the content distribution system may replace or alter the time-dependent promotional content with content that is not time dependent. For example, if the snipe for the live broadcast promoted a sporting event occurring next, the system may replace that snipe with a generic snipe that promotes the VOD provider or another media presentation without, for example, referencing any particular timeslot or date. Advantageously, the time-dependent content (e.g., snipes and promotional advertisements) can be removed from the recording provided to the VOD provider and still be used to get Nielsen credit when viewed within a certain time period—e.g., within three days of the live broadcast. Nielsen credit is important since this information is used to track the number of people viewing the show, which affects the price a third party may pay for advertisements during the commercial breaks. In one embodiment, the ratings for the VOD content are cumulative with the ratings of the live broadcast.

Figure 1:
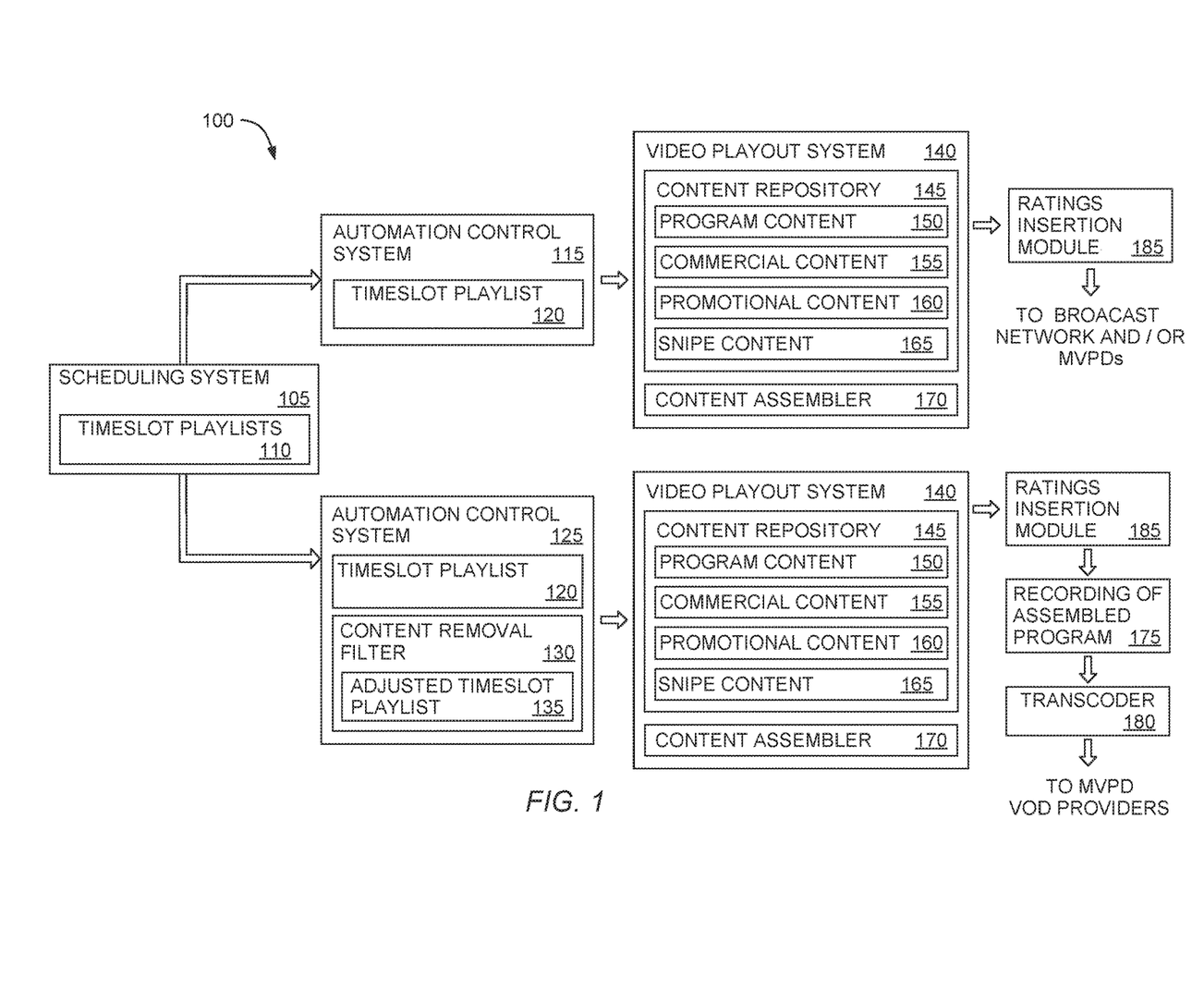
FIG. 1 illustrates a system for providing live and VOD content, according to one embodiment described herein.

FIG. 1 illustrates a content distribution system 100 for providing live and VOD content, according to one embodiment described herein. Although not shown, the various components in the content distribution system 100 may be software, hardware, firmware, or combinations thereof. Moreover, the system 100 may include any number of computing systems which include processors and memory for performing the functions described herein.

Figure 2:
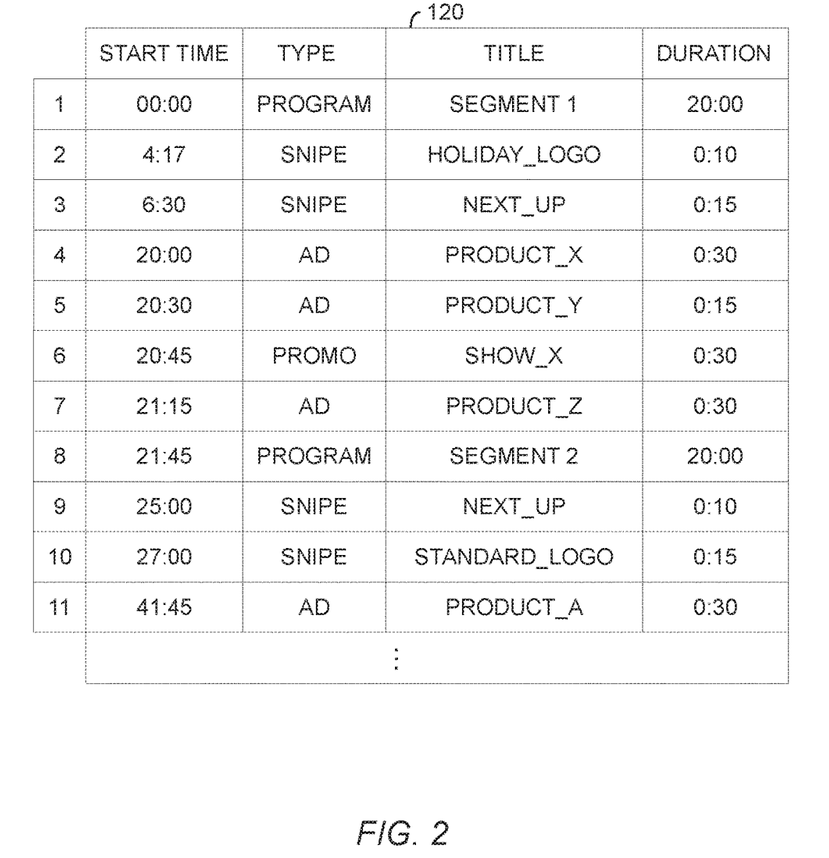
FIG. 2 is a timeslot playlist for live broadcast, according to one embodiment described herein.

The content distribution system 100 includes a scheduling system 105, automation control systems 115 and 125, a video playout system 140, and a transcoder 180. The scheduling system 105 generates a timeslot playlist 110 for each media presentation or show. Generally, the playlists 110 (an example of which is illustrated in FIG. 2) include a list of content (e.g., program segments, snipes, commercials, promotions, advertisements, other interstitial material, etc.) which instructs the automation control system 115 how to assemble the content for the corresponding media presentation. For example, the timeslot playlist 110 may indicate that a first segment of the show is aired first followed by three minutes of commercials before the second segment of the show is then aired. Moreover, different snipes may be played at the same time the segments of the show are aired.

The scheduling system 105 sends the same timeslot playlist 120 to both automation control system 115 and automation control system 125. Generally, the top half of the system 100 illustrates a flow for providing content that is intended for live broadcast either over a wireless telecommunication network (e.g., over-the-air broadcast using antennas) or a wired telecommunication network (e.g., a cable network using set top boxes). Conversely, the bottom half of the system 100 illustrates a flow for providing content that is intended to be delivered to a user via a VOD provider. That is, unlike in the top half where the content generated by the system 100 is broadcasted during a predetermined timeslot, the content generated by the bottom half is saved by the VOD provider and only transmitted to a user in response to a user request.

The automation control system 115 uses the timeslot playlist 120 to generate instructions for the video playout system 140 to assemble the content for the media presentation. As shown, the video playout system 140 includes a content repository 145 which stores program content 150, commercial content 155, promotional content 160, and snipe content 165. The system 140 also includes a content assembler 170 which receives and processes the instructions from the automation control system 115. For example, if the timeslot playlist 120 indicates that the first time slot should be the first segment of a show, the content assembler 170 requests that segment from the program content 150 portion of the repository 145. The program content 150 may include the program content (along with individual segments) for a plurality of shows. For example, the program content 150 may include the pre-recorded content for all the shows that are broadcasted on the telecommunication or cable network. Using the playlist 120 and the instructions provided by the automation control system 115, the content assembler 170 can retrieve the corresponding show segments from the program content 150 portion of the repository 145.

The timeslot playlist 120 may also indicate timeslots where commercial content 155, promotional content 160, and snipe content 165 should be outputted. Using this information, the content assembler 170 can gather all the content for the media presentation and output the assembled content to the broadcast network and/or multichannel video programming distributor (MVPD)—e.g., a direct-broadcast satellite provider, cable television provider, or telecommunication provider. As used herein, the commercial content 155 includes advertisements aired during commercial breaks that are paid for by third parties. The commercial content 155 may be displayed between segments of the show or at the end of the media presentation—i.e., between shows. The promotional content 160 includes advertisements aired during commercial breaks that promote shows or events broadcasted by the network (i.e., the telecommunication, satellite, or cable company) or promote the network generally. For example, the promotional content 160 may be a sneak peak of the plot line for next week's show or a trailer for the show that follows the current show on the network's broadcast timeline. The snipe content 165 includes any graphics or text displayed that overlays the program content 150. Although the snipe content 165 can be a paid advertisement for a third party, this content 165 is generally used to promote the network or shows on the network like promotional content 160. The combination of all the content described above for a particular timeslot in a broadcast schedule is referred to as the media presentation.

The promotional content 160 and snipe content 165 can be time-dependent such that the information provided in this content can become stale depending on when the content is viewed by the user. For example, if the snipe content 165 promotes the show that follows the current show, this information is not as useful to a subscriber to the network who watches the media presentation later using VOD. Thus, as described below, this time-dependent promotional content can be removed from the version of the media presentation distributed using VOD.

Before broadcasting the content a ratings insertion module 185 inserts adds ratings data to the content that enables a ratings agency (e.g., Nielsen) to issue credit for the user viewing the content. The ratings data may include a watermark or other metadata that can provide information such as a source identification code, program content provider, final distributor, etc. Using this data, the ratings agency can verify that the viewer watched the content which increases the ratings of the content.

In one embodiment, the content assembler 170 streams the content to the broadcast network. That is, the content assembler 170 may not wait to assemble all the content for a particular media presentation before transmitting the content to the broadcast network. The broadcast network can then immediately relay the content received from the content assembler 170 to the viewers. Alternatively, the content assembler 170 may wait until all the content for a particular media presentation has been gathered before sending a recording of the combined content to the broadcast network. For example, the content assembler 170 may send recordings for each timeslot for the day to the broadcast network or MVPD. The network or MVPD can save and then broadcast the individual recordings of the media presentation during their corresponding timeslots. In this example, the content distribution system 100 provides the recordings for the live broadcast before the shows are scheduled to be aired.

Unlike automation control system 115, the automation control system 125 alters the timeslot playlist 120 received from the scheduling system 105 to generate an adjusted timeslot playlist 135. Specifically, the system 125 includes a content removal filter 130 that searches the timeslot playlist 120 for time-dependent promotional content and removes this promotional content from the playlist 120 when generating the adjusted timeslot playlist 135. In other embodiments, the content removal filter 130 replaces some or all of the time-dependent promotional content with other content that is not time dependent. For example, instead of a snipe that promotes the show next up in the broadcast schedule, the content removal filter 130 may insert a snipe into the playlist 135 that promotes the broadcast or cable network (e.g., a graphic or the logo of the network).

Using the adjusted timeslot playlist 135, the automation control system 125 outputs instructions to the content assembler 170 in the video playout system 140 for preparing a recording of the media presentation. However, unlike a recording for live broadcast, here, a recording 175 generated by the content assembler 170 lacks time-dependent promotional content. Put differently, the recording of the assembled program 175 has some promotional content removed relative to the recording used for the live broadcast. However, in one embodiment, the recording 175 used for VOD has the same program content 150 and commercial content 155 such that a user viewing the recording 175 qualifies for Nielsen credit. That is, the recording 175 is a mirror of the broadcast content except that at least some of the time dependent content (e.g., a snipe or promotional material) has been removed. In this manner, the recording 175 still enables a network to get Nielsen credit but removes time-dependent promotional content that may no longer be relevant when viewed by a subscriber. For example, Nielsen credit can require the time codes for the program content 150 and the paid commercial content 155 in the VOD recording 175 to substantially match (e.g., within a second) the broadcast content, but the snipe and promotional content are not required. Although the embodiments here describe generating a recording that qualifies for Nielsen credit, this disclosure may be used to generate a recording that satisfies the requirements for any rating agency or standard.

The ratings insertion module 185 adds ratings data to the recording 175 that enables the ratings agency (e.g., Nielsen) to issue credit for the user viewing the recording 175. As above, the ratings data may include a watermark or other metadata that can provide information such as a source identification code, program content provider, final distributor, etc.

Before sending the recording 175 to the VOD provider(s), the transcoder 180 alters the format of the recording 175 to a digital format supported by the VOD provider. For example, different providers may use different audio and/or video formats (e.g., compressed or uncompressed) for their content. The transcoder 180 changes the format of the recording 175 to the format used by the VOD providers.

In one embodiment, the MVPD VOD providers transmit the recordings received from the content distribution system 100 to subscribers to the broadcast or cable network using their own network—e.g., a cable network or satellite network—rather than using a general network such as the Internet. For example, receiving VOD content may require the subscribers to own a set top box which permits the user to select and stream the VOD content via the provider's communication network. In one embodiment, the transcoder 180 can provide the recording 175 to any type of content distributor such as a MVPD VOD, internet content provider, streaming service, and the like.

However, in another embodiment, the content distribution system 100 may transmit the transcoded media presentation to the user (e.g., via the Internet) without using a MVPD VOD provider or other content provider. For example, a user device may include an application that permits the user to request a particular show directly from the content distribution system 100. In response to a user request, the content distribution system 100 transmits a copy of the recording 175 of the media presentation (which lacks the time-dependent promotional content) to the user.

Although FIG. 1 illustrates two separate video playout systems 140, in one embodiment, the system 100 may include only one video playout system 140 that is accessed to generate the recordings for the live broadcast as well as the recordings for VOD. For example, the video playout system 140 may be a data center which can execute simultaneous requests from multiple automation control systems. That is, the content assembler 170 can generate a recording for live broadcast at the same time the assembler generates a recording for VOD. Similarly, although FIG. 1 illustrate two separate automation control systems, the functions described herein may be performed by a single application which can generate instructions for the video playout system 140 for live and VOD recordings in parallel.

FIG. 2 is a timeslot playlist 120 for live broadcast, according to one embodiment described herein. In one embodiment, the timeslot playlist 120 is the same playlist 120 that is transmitted to both automation control systems 115 and 125 from the scheduling system 105 shown in FIG. 1. As shown, the playlist 120 includes a list of rows that dictate what content is being played at what time during the timeslot for the media presentation. In this example, row 1 of the playlist 120 indicates that program content—i.e., "Segment 1"—should be outputted first. For example, the media presentation may be an hour long and is divided into three segments separated by respective commercials breaks. Here, Segment 1 of the show begins at time 00:00 and lasts for a duration of twenty minutes.

During Segment 1, the playlist 120 dictates that two different snipes should be aired as shown in rows 2 and 3. The snipe "Holiday_Logo" begins at timestamp 4:17 in the media presentation and lasts for ten seconds. The snipe "Next_Up" begins at timestamp 6:30 and lasts for fifteen seconds. Both of these snipes include promotional content that is time dependent. That is, the snipes provide promotional content that is relevant based on when the media presentation is viewed by the user. In one embodiment, the time-dependent promotional content promotes an event that occurs in the past depending on when the user views the recording such as whether the Holiday corresponding to the "Holiday_Logo" has passed or if the next show following the current media presentation has already aired.

After twenty minutes, Segment 1 completes and the commercial break begins at row 4 where a commercial advertisement for "Product_X" is aired for thirty seconds. The commercial break includes two other commercial advertisements (e.g., commercial content 155) at rows 5 and 6. Furthermore, the playlist 120 dictates that a promo titled "Show_X" should be aired at timestamp 20:45. Unlike the commercial advertisements, the promo informs the user about another show affiliated with the broadcast network. In one example, the promo is a time-dependent promo which provides a sneak peak of this week's episode of Show_X. Alternatively, the promo may be a general trailer of Show_X that is relevant for describing the media presentation regardless of when the promo is viewed by the user (either live or using VOD).

Once the commercial break is over, the playlist 120 indicates that "Segment_2" of the program is aired at the 21:45 timestamp and lasts for another twenty minutes. Like above, two more snipes are displayed during Segment_2 before a second commercial break begins at timestamp 41:45. In this example, the snipe at row 9 is the same as the snipe aired at row 2, and thus, includes time-dependent information. However, the snipe at row 10 titled "Standard_Logo" includes a graphic illustrating the trademark or logo of the broadcast network. As such, this snipe does not include time-dependent content.

In one embodiment, the playlist 120 is not changed by the automation control system 115 for generating a recording for live broadcast. However, because of the time-dependent content in playlist 120, the content removal filter 130 removes some or all of the time-dependent promotional content before generating a recording for VOD providers.

Figure 3:
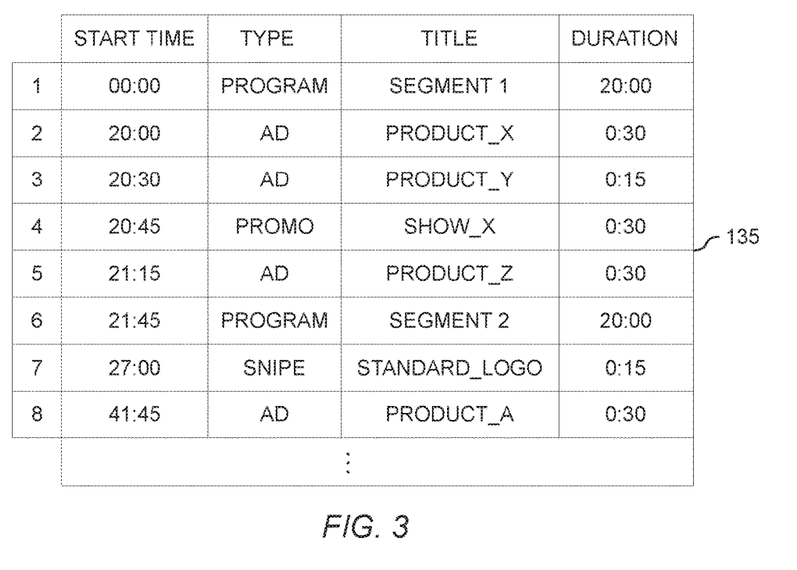
FIG. 3 is a timeslot playlist for VOD, according to one embodiment described herein.

FIG. 3 is the adjusted timeslot playlist 135 for VOD, according to one embodiment described herein. While timeslot playlist 120 in FIG. 2 is used to generate the live recording, the adjusted timeslot playlist 135 is used for generating the VOD recording. As shown, the playlist 135 has the same program and commercial content as playlist 120. That is, program segments and commercial advertisements shown in rows 1, 4-8, and 10 of playlist 120 are also in playlist 135. Moreover, the duration and timestamps for these common events are the same. As such, the playlist 135 satisfies the requirements for receiving Nielsen credit.

However, the content removal filter 130 in FIG. 1 has removed some of the time-dependent promotional content from the playlist 120 when generating the adjusted playlist 135. Specifically, the filter 130 removed the snipes at rows 2, 3, and 9 from playlist 120. As such, a user viewing the VOD recording generated using playlist 135 does not see the Holiday_Logo and Next_Up snipes that a user viewing the live recording would see. However, the content removal filter 130 did not remove the Standard_Logo snipe from the playlist 135 since this snipe does not include time-dependent promotional content. Instead, the Standard_Logo promotes the broadcast network generally without its relevance being dependent on when the user views the snipe.

As described above, the automation control system 125 uses the adjusted timeslot playlist 135 to generate a recording for distribution to VOD providers. Although playlist 135 removes all the snipes that include time-dependent promotional content, in other embodiments, the content removal filter 130 may determine a time when the promotional content becomes stale—i.e., when the content is no longer relevant—and use this information to determine whether to keep or remove the snipe from the playlist 135. For example, if the snipe promotes a media presentation that is next up in the broadcast lineup or an episode of the media presentation that airs next week, the content removal filter 130 removes the snipe. However, if the snipe promotes an important sporting event that is scheduled to be broadcasted on the network in a month, the filter 130 may keep the snipe in the playlist 135 so that subscribers who view the media presentation via VOD know that the future sporting event will be broadcasted on the network. In this example, the content removal filter 130 uses a threshold (e.g., if the promotional content becomes stale in two weeks) to determine whether to keep or remove the time-dependent promotional content from the adjusted playlist 135.

Figure 4:
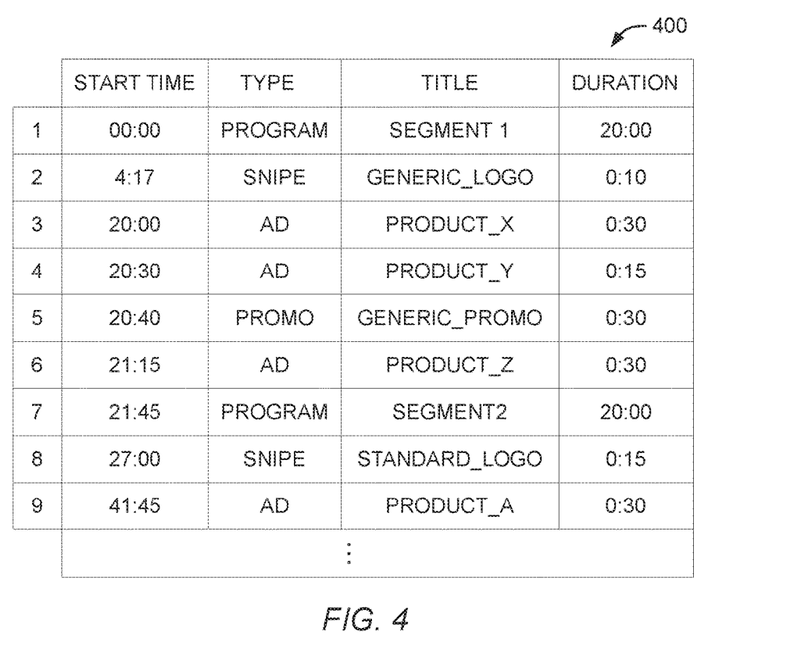
FIG. 4 is a timeslot playlist for VOD, according to one embodiment described herein.

FIG. 4 is an adjusted timeslot playlist 400 for VOD, according to one embodiment described herein. Like the timeslot playlist 135, the timeslot playlist 400 is derived from the timeslot playlist 120 illustrated in FIG. 2. Here, the content removal filter 130 replaces the time-dependent promotional content with promotional content that is not time dependent. For example, the snipe at row 2 of playlist 120 (i.e., "Holiday_Logo") is replaced in playlist 400 with a snipe titled "Generic Logo" which may be a graphic of the logo or trademark of the broadcast or cable network providing the VOD service. Thus, in addition to removing the time-dependent content (e.g., the snipes in row 2 and 3 in playlist 120), the filter 130 can add in snipes that are not time dependent.

Moreover, when generating playlist 400, the filter 130 replaces the promo at the timestamp 20:40 from a time-dependent promotion of Show_X with a generic promotion "Generic_promo" of the broadcast or cable company. For example, the generic promotion may tout the success of the company or state that the company has the most popular shows during this portion of the commercial break. Although the promotional content inserted by the content filter 130 may have no time sensitivity, in other embodiments, the inserted content may have some time sensitivity to when the user views the recording derived from the playlist 400. For example, the Generic_promo may state that a morning talk show on the network was the nation's most watched morning show last year. If this promo is viewed the following year, this promo may no longer be relevant or up to date. However, because the information becomes stale a long time after the VOD content becomes available, the filter 130 can nonetheless insert this promotion into the playlist 400. Thus, the content inserted into the playlist 400 does not need to be completely devoid of time-dependent content.

Using playlist 400, the automation control system 125 can generate a recording for VOD providers which replaces the time-dependent content in the snipes and the promotional advertisement with content that is deemed as not being time dependent. In this manner, the user does not have to watch content that is stale or out of date.

Figure 5A:
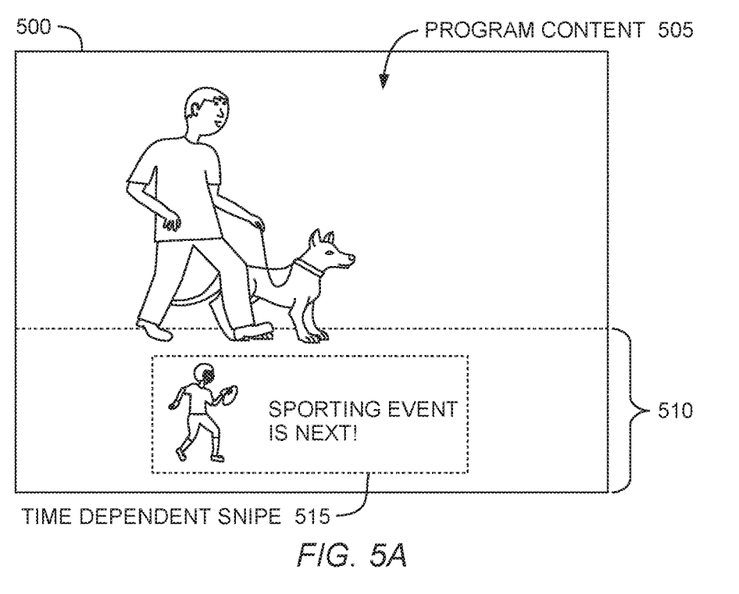
FIGS. 5A and 5B illustrate removing time-dependent promotional content from a media presentation, according to one embodiment described herein.
Figure 5B:
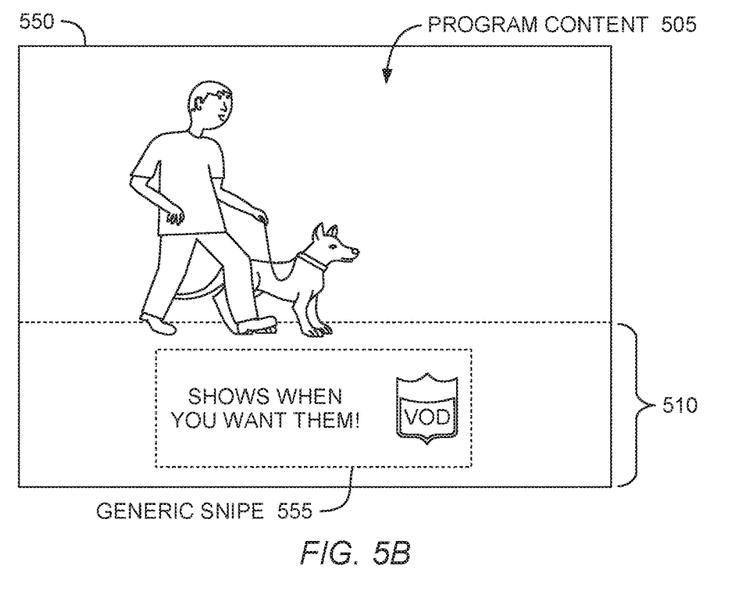

FIGS. 5A and 5B illustrate removing time-dependent promotional content from a show, according to one embodiment described herein. FIG. 5A illustrates a frame 500 from a recording for a live broadcast while FIG. 5B illustrates a frame 550 from a recording for VOD. Frame 500 includes program content 505 from a media presentation that is overlaid by a time-dependent snipe 515 that appears on a bottom third 510 of the frame 500. In one embodiment, the bottom third 510 is reserved for the broadcast or cable network to display different snipes or information over the program content 505.

The snipe 515 may include a graphic or animation of an athlete running across the screen to advertise a sporting event occurring after the media presentation is over. Although this snipe 515 is relevant to user who is watching the media presentation live in its scheduled time slot, this information may be stale for someone watching the media presentation using VOD. Thus, frame 500 may be used only in a recording prepared for a live broadcast.

In contrast, frame 550 may be used in a recording of the media presentation for VOD. The program content 505 in both frames 500 and 550 are the same, however, the snipe 515 has been replaced with a generic snipe 555. The snipe 555 promotes the VOD provider and displays the logo of the provider. Here, the frame 550 may correspond to the playlist 400 shown in FIG. 4 where the Generic Logo snipe is displayed at the 4:17 timestamp.

Figure 6:
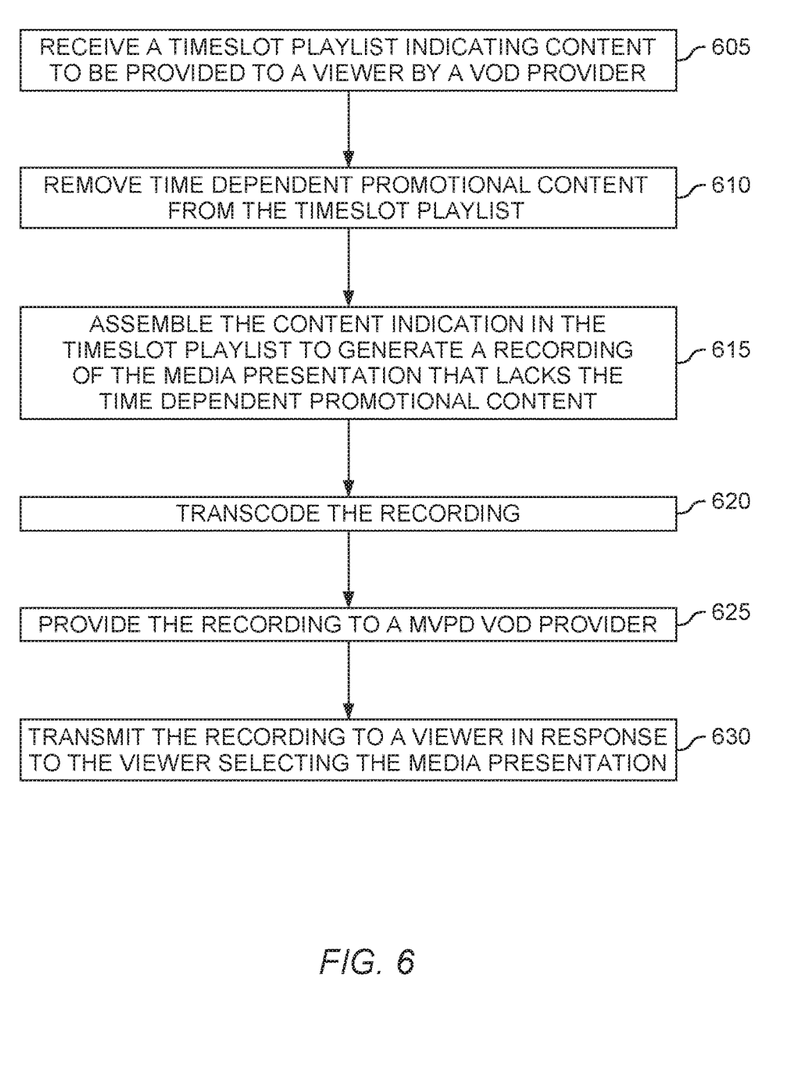
FIG. 6 is a flowchart for removing time-dependent promotional content from a media presentation to make a VOD recording, according to one embodiment described herein.

FIG. 6 is a flowchart 600 for removing time-dependent promotional content from a media presentation to make a VOD recording, according to one embodiment described herein. At block 605, an automation control system receives a timeslot playlist indicating content to be provided to a viewer by a VOD provider. The timeslot playlist includes time-dependent promotional content that contains information that is relevant depending on when a user views the recording corresponding to the media presentation. For example, if the user views the media presentation before a certain date, the time-dependent content is relevant and up to date. However, if viewed after the date, the time-dependent content is stale and is irrelevant. The time-dependent promotional content may be, for example, a snipe overlaying the program content or a promotional advertisement shown during a commercial break.

At block 610, the content removal filter identifies and removes the time-dependent promotional content from the timeslot playlist to generate an adjusted timeslot playlist. To identify the time-dependent promotional content, in one embodiment, the content removal filter includes a list of all snipes and promotional content that contains time-dependent content. For example, when content is added to the content repository, promotional content that is time dependent is flagged so that it can be removed by the filter. In another embodiment, the promotional content may include an expiration date that indicates when the information in the promotional content becomes stale. The content removal filter may compare this date to a threshold to determine whether to keep the promotional content in the adjusted playlist or remove the content. For example, the filter may remove snipes that have expiration dates that are within two weeks of the current date.

In one embodiment, the adjusted timeslot playlist satisfies the requirements for receiving Nielsen credit for a user who watches a recording generated from the adjusted playlist. As such, the adjusted timeslot playlist has the same program content and commercial advertisement content as the original timeslot playlist.

At block 615, a content assembler assembles the content indicated in the adjusted timeslot playlist to generate a recording of the media presentation that lacks the time-dependent promotional content. For example, the time-dependent snipe 515 shown in FIG. 5A may be removed from the recording or replaced by the generic snipe 555 shown in FIG. 5B.

At block 620, a transcoder transcodes the recording into one or more formats compatible with the VOD providers. At block 625, the content distribution system provides the transcoded recording to the MVPD VOD providers. At block 630, the VOD providers transmit the recording to a viewer in response to the viewer selecting the media presentation. In one embodiment, the recording is stored by the VOD provider and not at the location of the client. That is, instead of being stored on a local digital video recorder (DVR) which the viewer can access to watch the media presentation, the recording may be streamed to the user via the provider's network in response to a request from the user to watch the media presentation. In one embodiment, the user may have the ability to fast forward through the recording (e.g., to skip commercial) when streaming the presentation from the VOD provider, but in other embodiments, the user has to watch the commercials to receive Nielsen credit.

In one embodiment, the content removal filter may remove other portions of the adjusted timeslot playlist after the window for receiving Nielsen credit closes. To get Nielsen credit, the user may have to watch the recording using VOD within seven days of when the media presentation aired live. Once the window for getting credit has closed, in one embodiment, the automation control system may remove the commercials from the adjusted timeslot playlist to generate a new recording for the VOD providers. Alternatively, once the credit window closes, the automation control system may insert a different set of commercials to replace the commercials that aired originally in the media presentation.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for providing a recording of a media presentation, the method comprising:
   receiving a timeslot playlist for the media presentation, wherein the timeslot playlist comprises a list of content to be provided to a user, wherein the list of content comprises entries for program content, time-dependent promotional content, and commercial advertisement content, wherein the time-dependent promotional content contains information that is relevant depending on when the user views the media presentation;
   removing at least a portion of the time-dependent promotional content from the timeslot playlist to generate an adjusted timeslot playlist; and
   assembling, using one or more computer processors, content listed in the adjusted timeslot playlist to generate the recording of the media presentation, wherein the recording comprises the program content and the commercial advertisement content and excludes the removed time-dependent promotional content.

2. The method of claim 1, wherein a total duration of the list of content in the timeslot playlist is the same as a total duration of a list of content in the adjusted timeslot playlist.

3. The method of claim 1, further comprising:
   assembling the content listed in the timeslot playlist to generate a different recording of the media presentation for a live broadcast, wherein the different recording includes the time-dependent promotional content.

4. The method of claim 1, wherein the list of content in the timeslot playlist includes a snipe comprising the time-dependent promotional content, wherein the snipe is configured to overlay the program content.

5. The method of claim 1, wherein the list of content in the timeslot playlist includes promotional content comprising the time-dependent promotional content, wherein the promotional content is scheduled to be outputted during a commercial break in the media presentation.

6. The method of claim 1, further comprising:
   replacing, before assembling the content listed in the adjusted timeslot playlist, the time-dependent promotional content in the adjusted timeslot playlist with promotional content that is not time dependent, wherein the promotional content promotes at least one of a video-on-demand (VOD) provider and a different media presentation affiliated with the VOD provider; and
   transmitting the recording to the VOD provider for distribution to the user in response to a user request.

7. The method of claim 1, wherein the information in the time-dependent promotional content promotes an event that occurs in the past depending on when the user views the recording.

8. The method of claim 1, wherein removing the time-dependent promotional content from the timeslot playlist comprises:
   identifying all the time-dependent promotional content in the timeslot playlist using a predefined flag, wherein the time-dependent promotional content is flagged when added to the timeslot playlist; and
   removing the identified time-dependent promotional content from the timeslot playlist.

9. The method of claim 1, wherein removing the time-dependent promotional content from the timeslot playlist comprises:
   identifying an expiration date for the time-dependent promotional content in the timeslot playlist, wherein the expiration date indicates when information in the time-dependent promotional content becomes stale; and
   comparing the expiration date to a threshold to identify the portion of the time-dependent promotional content that is removed from the timeslot playlist.

10. A non-transitory computer readable storage medium comprising:
    computer-readable program code for providing a recording of a media presentation, wherein, when executed by a computing processor, the computer-readable program code performs an operation comprising:
    receiving a timeslot playlist for the media presentation, wherein the timeslot playlist comprises a list of content to be provided to a user, wherein the list of content comprises entries for program content, time-dependent promotional content, and commercial advertisement content, wherein the time-dependent promotional content contains information that is relevant depending on when the user views the media presentation;
    removing at least a portion of the time-dependent promotional content from the timeslot playlist to generate an adjusted timeslot playlist; and
    assembling, using one or more computer processors, content listed in the adjusted timeslot playlist to generate the recording of the media presentation, wherein the recording comprises the program content and the commercial advertisement content and excludes the removed time-dependent promotional content.

11. The computer readable storage medium of claim 10, wherein a total duration of the list of content in the timeslot playlist is the same as a total duration of a list of content in the adjusted timeslot playlist.

12. The computer readable storage medium of claim 10, wherein the list of content in the timeslot playlist includes a snipe comprising the time-dependent promotional content, wherein the snipe is configured to overlay the program content.

13. The computer readable storage medium of claim 10, wherein the operation further comprises:
    replacing, before assembling the content listed in the adjusted timeslot playlist, the time-dependent promotional content in the adjusted timeslot playlist with promotional content that is not time dependent, wherein the promotional content promotes at least one of a video-on-demand (VOD) provider and a different media presentation affiliated with the VOD provider; and
    transmitting the recording to the VOD provider for distribution to the user in response to a user request.

14. The computer readable storage medium of claim 10, wherein the information in the time-dependent promotional content promotes an event that occurs in the past depending on when the user views the recording.

15. The computer readable storage medium of claim 10, wherein removing the time-dependent promotional content from the timeslot playlist comprises:
    identifying all the time-dependent promotional content in the timeslot playlist using a predefined flag, wherein the time-dependent promotional content is flagged when added to the timeslot playlist; and
    removing the identified time-dependent promotional content from the timeslot playlist.

16. The computer readable storage medium of claim 10, wherein removing the time-dependent promotional content from the timeslot playlist comprises:
    identifying an expiration date for the time-dependent promotional content in the timeslot playlist, wherein the expiration date indicates when information in the time-dependent promotional content becomes stale; and
    comparing the expiration date to a threshold to identify the portion of the time-dependent promotional content that is removed from the timeslot playlist.

17. A system, comprising:
    one or more computing processors; and
    a memory comprising a program that when executed by the one or more computer processors performs an operation comprising:
        receiving a timeslot playlist for a media presentation, wherein the timeslot playlist comprises a list of content to be provided to a user, wherein the list of content comprises entries for program content, time-dependent promotional content, and commercial advertisement content, wherein the time-dependent promotional content contains information that is relevant depending on when the user views the media presentation;
        removing at least a portion of the time-dependent promotional content from the timeslot playlist to generate an adjusted timeslot playlist; and
        assembling, using one or more computer processors, content listed in the adjusted timeslot playlist to generate a recording of the media presentation, wherein the recording comprises the program content and the commercial advertisement content and excludes the removed time-dependent promotional content.

18. The system of claim 17, wherein the information in the time-dependent promotional content promotes an event that occurs in the past depending on when the user views the recording.

19. The system of claim 17, wherein removing the time-dependent promotional content from the timeslot playlist comprises:
    identifying all the time-dependent promotional content in the timeslot playlist using a predefined flag, wherein the time-dependent promotional content is flagged when added to the timeslot playlist; and
    removing the identified time-dependent promotional content from the timeslot playlist.

20. The system of claim 17, wherein removing the time-dependent promotional content from the timeslot playlist comprises:
    identifying an expiration date for the time-dependent promotional content in the timeslot playlist, wherein the expiration date indicates when information in the time-dependent promotional content becomes stale; and
    comparing the expiration date to a threshold to identify the portion of the time-dependent promotional content that is removed from the timeslot playlist.

\* \* \* \* \*